United States Patent Office 3,386,926
Patented June 4, 1968

3,386,926
METHOD OF MAKING EXPANDABLE PEARLS OF STYRENE COPOLYMER
Juliette Gavoret, Paris, France, assignor to Produits Chimiques Pechiney - Saint - Gobain, Neuilly-sur-Seine, France
No Drawing. Filed May 18, 1964, Ser. No. 368,319
Claims priority, application France, May 20, 1963, 935,402
14 Claims. (Cl. 260—2.5)

ABSTRACT OF THE DISCLOSURE

The invention is addressed to expandable pearls of styrene copolymer and to the method for the preparation of same wherein a styrene component is copolymerized in aqueous suspension with at least one unsaturated aliphatic hydrocarbon, at least one of which is gaseous under normal temperature and pressure and is introduced after the polymerization has been initiated but before it is completed and is retained at least in part in the formed particles of the copolymer to function as the expansion agent.

---

This invention relates to expandable pearls of styrene copolymers and to a process for the preparation of same in aqueous suspension.

In the French Patent No. 1,179,397, filed on June 7, 1957, description is made of the preparation of expandable pearls of polystyrene in aqueous solution by the introduction, under normal pressure and temperature, of an inert gas or liquid expanding agent into the particles of polystyrene.

It is an object of this invention to produce and to provide a new and improved method for producing expandable pearls of styrene copolymers and it is a related object to provide a more efficient and more effective method for producing same.

In accordance with the practice of this invention, the expandable pearls of copolymers are based upon copolymerization in aqueous medium of a substituted or unsubstituted styrene or its copolymers with one or more unsaturated aliphatic hydrocarbons which are characterized as being gaseous under normal pressures and temperatures and in which at least one of the unsaturated aliphatic hydrocarbons is retained at least in part in the formed pearls to function as an agent for the expansion of the pearls.

As used herein, the term "styrene component" is meant to include styrene and substituted styrenes such as α-methylstyrene, ethylstyrene, chlorostyrene and the like, and copolymers such as styrene-acrylic nitrile, styrene-methyl methacrylate, styrene-α-methylstyrene and the like.

As used herein, the term "hydrocarbon component" is meant to include unsaturated aliphatic hydrocarbons such as butene, propene, butadiene, and the halogenated derivatives thereof, and particularly the fluorinated derivatives of butene, propene, butadiene and vinylidene.

The copolymers which are employed in the practice of this invention are in the form of the copolymers prepared by the reaction of the styrene component as one component and the hydrocarbon component as the other, or in the form of terpolymers formed of the styrene copolymer as one component and more than one hydrocarbon component as the other components. The copolymers formed with one or more hydrocarbon components may be either in statistical distribution or in block, in sequence or grafted, depending upon the conditions of temperature, pressure, polymerization rate, and the like, which are characteristic of classical techniques suitable to these various components, the selection of conditions being made in accordance with the desired characteristics, as is already known for such components.

In accordance with the practice of this invention, at least one of the unsaturated aliphatic hydrocarbons is introduced under pressure in the reaction medium during polymerization, depending somewhat upon the desired copolymer. In the preferred practice of this invention, the hydrocarbon component is introduced into the aqueous suspension of the reaction mixture after the copolymerization reaction has advanced by the amount of 30 to 90 percent calculated upon the styrene component. The introduction of the hydrocarbon component can be made all at one time or in several successive increments during different stages of the reaction and at a temperature below, equal to, or above the melting point of the polymer.

The proportion of hydrocarbon component can be varied depending upon the desired copolymer. It is desirable to make use of the hydrocarbon component in an amount within the range of 3 to 18 percent by weight of the styrene component so that the hydrocarbon component will not be copolymerized in its entirety with the result that a portion of the hydrocarbon component remains within the pearls of the copolymer for subsequent function as the expansion agent.

It has been found that the pearls of the copolymers, having a high percentage of the styrene component, including styrene, substituted or unsubstituted styrenes or derivatives thereof, have remarkable properties for retention of the gaseous expansion agent in which the presence of a dissolving intermediate is not required, as in presently known techniques.

As is well known, the copolymerization in aqueous medium is generally carried out in the presence of a polymerization catalyst and one or more suspension agents. As the catalyst, use can be made of conventional catalyst for the polymerization of styrene, substituted or unsubstituted, or of its copolymers, such as benzoyl peroxide, lauroyl peroxide, di-tertiobutyl peroxide, dicumyl peroxide, chlorobenzoyl peroxide, cumene hydroperoxide, α,α-azodiisobutyronitrile, and the like. Any one or a mixture of such catalysts can be used. The catalyst can be employed in an amount within the range of 0.1 to 1.0 percent by weight and preferably 0.2 to 0.5 percent by weight based upon the styrene component.

The suspension agents are in the form of colloidal protectors and suspension agents of the type generally employed in the polymerization in aqueous suspension of styrene, substituted or unsubstituted, or its copolymers, and includes such materials as methylcellulose, ethylcellulose, polyvinyl alcohol, tricalcium phosphate, and potassium salts of styrene-maleic anhydride copolymer, and the like. The various suspension agents can be used alone or in admixture. The suspension agents can be used in an amount within the range of 0.01 to 1 percent by weight and preferably 0.1 to 0.5 percent by weight of the reaction mixture and they can be incorporated into the reaction system in a single increment or in separate stages.

In the preferred practice of this invention, as the unsaturated hydrocarbon component copolymerized with the styrene component, use is made of a butene isomer, such as butene-1, butene-2, isobutene, or a $C_4$ petroleum fraction containing a high proportions of butenes. In such event, the styrene component and the water for suspension are introduced together into an autoclave in the ratio of 10 to 70 parts by weight of the styrene component to 90 to 30 parts by weight of water, and preferably 40 to 60 parts by weight of the styrene component to 40 to 60 parts by weight of water in the order indicated. When the reaction is completed the materials are cooled and the pearls of copolymer are separated by any one of a number of conventional means, such as filtration, decantation, centrifugal separation and the like, from the reaction medium. As in the particular case of the copolymers formed of styrene and butene, separation is easily achieved to provide pearls having an average diameter within the range of 0.5 to 5.0 mm. and generally approaching 1 mm.

The pearls of copolymer, obtained in accordance with the practice of this invention, can be expanded by conventional means to an amount depending somewhat upon their composition, density and amount of expansion agent present, etc. An expanded product is secured which is characterized by a minimum density in the order of about 15 kg./m.$^3$, as in the case of the styrene-butene copolymer. The expanded pearls are immutable and can be formed by cutting, sawing, bonding, and the like. It will be understood that, prior to expansion, additions can be made to incorporate dyestuffs, fillers, plasticizers, stabilizers and the like, for imparting color and modification to the expanded particles.

The following examples are given by way of illustration, but not by way of limitation, of the practice of this invention:

EXAMPLE 1

In an autoclave having a capacity of 500 liters and equipped with an agitator, an inlet for liquids and an inlet for gas, and a means for heating, introduction is made of 200 liters of water, 200 liters of styrene, and 600 grams of benzoyl peroxide. The temperature is raised to 90° C. with constant agitation and then 461 grams of tricalcium phosphate and 380 grams of polyvinyl alcohol are introduced as suspension agents. The reaction medium is maintained for 4 hours at 90° C. and then 380 grams of polyvinyl alcohol are added. After heating for 5 hours at 90° C., 14.7 kg. of C$_4$ petroleum fraction containing 91 percent of butenes are introduced under a pressure of 7.5 kg./cm.$^2$ for 15 minutes. The reaction mixture is maintained for 2 hours at 90° C. during which the pressure drops from 10 to 8.2 kg./cm.$^2$.

The temperature is then raised from 90° to 110° C. in successive stages calculated to maintain a pressure below 10 kg./cm.$^2$ and thereafter the reaction is maintained at 110° C. for 1 hour. The mixture is slowly cooled to room temperature with a reduction in pressure to about 0.5 kg./cm.$^2$. The reaction mixture is removed from the autocalve and the pearls of copolymer formed during the process are separated from the liquid reaction medium by decantation and the separated pearls are washed with water.

The pearls are generally spherical in form, the granulometry of which is determined according to the French norm AFNOR X11501 by an 80 percent refusal in a sieve number 30, which corresponds to a 0.80 mm. mesh. When placed in a mold and heated with steam, the pearls expand to form a mass having a density of 46 kg./m.$^3$.

EXAMPLE 2

In an autoclave having a capacity of 20 liters, there is introduced 4.5 liters of water, 20 grams of polyvinyl alcohol, 4.5 liters of styrene and 10.5 grams of benzoyl peroxide. The temperature is raised to 90° C. and maintained at 90° C. for 5½ hours with constant agitation. The temperature is reduced by cooling to 60° C. in 30 minutes and then 405 grams of butene is introduced under a pressure of 7.5 kg./cm.$^2$ for 10 minutes. The temperature of the reaction medium is raised to 90° C. in 1 hour and the temperature is maintained for 1½ hours.

The temperature is thereafter raised to 130° C. in increments so as not to exceed a pressure of 10 kg./cm.$^2$ and then it is held at 130° C. for 1 hour. After cooling, the pearls of the formed copolymer are separated from the reaction mixture by decantation. The granulometry shows a refusal of 100 percent in the sieve 30. When placed in a mold and heated with steam, the pearls expand to a mass having a density of 44 kg./m.$^3$.

EXAMPLE 3

The same process is carried out as in Example 2 but the temperature of 90° C. is maintained for 7 hours and then 405 grams of butene is introduced at 90° C. under a pressure of 7.5 kg./cm.$^2$ for 10 minutes. The temperature is then raised to 130° C. in successive steps so as not to exceed a pressure of 10 kg./cm.$^2$ and it is maintained at this temperature for 1 hour. The pearls of the formed copolymer are separated by decantation and are dimensioned to provide a refusal of 87 percent in sieve 30. The expanded mass obtained from the separated pearls has a density of 50 kg./m.$^3$.

EXAMPLE 4

In an autoclave having a capacity of 20 liters, there is introduced 4.5 liters of water, 20 grams of polyvinyl alcohol, 4.5 liters of 1,2,4-trichlorostyrene and 10.5 grams of benzoyl peroxide. The temperature is raised to 90° C. and maintained at 90° C. for 5½ hours with constant agitation. The temperature is reduced by cooling to 60° C. in 30 minutes and then 405 grams of butene is introduced under a pressure of 7.5 kg./cm.$^2$ for 10 minutes. The temperature of the reaction medium is raised to 90° C. in 1 hour and the temperature is maintained for 1½ hours.

The temperature is thereafter raised to 130° C. in increments so as not to exceed a pressure of 10 kg./cm.$^2$ and then it is held at 130° C. for 1 hour. After cooling, the pearls of the formed copolymer are separated from the reaction mixture by decantation. The granulometry shows a refusal of 100 percent in the sieve 30. When placed in a mold and heated with steam, the pearls expand to a mass having a density of 68 kg./m.$^3$.

EXAMPLE 5

In the apparatus of Example 1, introduction is made of 280 liters of water, 92 liters of styrene, 28 liters of acrylic nitrile, 600 grams of lauroyl peroxide and 2000 grams of polyvinyl alcohol. The temperature is raised to 70° C. and maintained at this temperature for 4 hours with constant agitation. 9.6 kg. of butene are then introduced under a pressure of 7.5 kg./cm.$^2$. The suspension under continuous agitation is maintained at 70° C. for 1 hour and then at 90° C. for 1 hour, and finally at 110° C. for 1 hour. The pearls of the formed copolymer are separated upon cooling and are dimensioned to give a 90 percent refusal in a sieve 30. The pearls produce an expanded mass having a density of 30 kg./m.$^3$.

EXAMPLE 6

In an autoclave having a capacity of 500 liters, introduction is made of 200 liters of water, 190 liters of styrene, 10 liters of butadiene, 500 grams of benzoyl peroxide and 2000 grams of polyvinyl alcohol. The temperature is raised to 90° C. for 5½ hours and then 20 kg. of butene are introduced under a pressure of 8 kg./cm.$^2$. The suspension is maintained at 90° C. for 2 hours, then at 100° C. for 1 hours, then at 110° C. for 1 hour, and then at 120° C. for 1 hour. A constant agitation is maintained throughout. The pearls of the formed copolymer are separated and are dimensioned to provide a refusal of 85 percent in sieve 30. An expanded mass prepared from the pearls gives a density of 20 kg./m.$^3$.

It will be apparent from the foregoing that I have provided a more efficient and effective means and method for producing expandable pearls of styrene copolymers and that I have also produced a new and improved expandable styrene copolymer.

It will be understood that changes may be made in the details of formulation and reaction without departing from the spirit of the invention, especially as defined in the following claims.

I claim:

1. In the process for producing expandable pearls of styrene copolymer, the step of copolymerizing in hot aqueous medium a styrene component and at least one unsaturated aliphatic hydrocarbon component which is gaseous under normal temperature and pressure introduced after the polymerization of the styrene component has been initiated but before it is completed, cooling the material to terminate the polymerization reaction before copolymerization of said added unsaturated aliphatic hydrocarbon component is completed whereby said unpolymerized portion is retained in the particles of the copolymerized product to function as an expansion agent.

2. In the process for producing expandable particles of styrene copolymer, the steps of copolymerizing in aqueous medium a styrene component and at least one unsaturated aliphatic hydrocarbon component in which at least one of the unsaturated aliphatic hydrocarbon components is gaseous under normal temperature and pressure and is introduced after the polymerization of the styrene component has been initiated but before it is completed and is retained at least in part in the formed particles of the copolymer to act as the expansion agent in the formed copolymer, maintaining a state of agitation during the copolymerization, and separating the formed component from the reaction mixture.

3. The process as claimed in claim 2 in which the styrene component is selected from the group consisting of styrene, α-methylstyrene, ethylstyrene, chlorostyrene, and copolymers selected from the group consisting of styrene acrylic nitrile, styrene methyl methacrylate, and α-methyl styrene and mixtures thereof.

4. The process as claimed in claim 2 in which the unsaturated aliphatic hydrocarbon component is selected from the group consisting of butene, propene, butadiene, $C_4$ petroleum fraction containing a high percentage of butenes, halogenated derivatives of butene, propene, butadiene and $C_4$ petroleum fractions containing a high percentage of butenes and vinylidene halide.

5. The process as claimed in claim 2 in which the introduction of the unsaturated aliphatic hydrocarbon component is made after the polymerization of the reaction has progressed by an amount within the range of 30 to 90 percent based upon the styrene component.

6. The process as claimed in claim 5 in which the unsaturated aliphatic hydrocarbon component is introduced under pressure.

7. The process as claimed in claim 2 in which the unsaturated aliphatic hydrocarbon component is introduced in an amount within the range of 3 to 18 percent by weight of the styrene component.

8. The process as claimed in claim 2 in which the unsaturated aliphatic hydrocarbon component is introduced in an amount within the range of 8 to 12 percent by weight of the styrene component.

9. The process as claimed in claim 2 in which the ratio of water to styrene is within the range of 10 to 70 parts by weight of the styrene component to 90 to 30 parts by weight of water.

10. The process as claimed in claim 2 in which the ratio of water to styrene is within the range of 40 to 60 parts by weight of the styrene component to 60 to 40 parts by weight of water.

11. The process as claimed in claim 2 in which the reaction mixture includes a polymerization catalyst in an amount within the range of 0.1 to 1 percent by weight of the styrene component.

12. The process as claimed in claim 2 in which the reaction mixture includes a polymerization catalyst in an amount within the range of 0.2 to 0.5 percent by weight of the styrene component.

13. The process as claimed in claim 2 in which the reaction mixture includes a suspension agent in an amount within the range of 0.01 to 1.0 percent by weight of the mixture.

14. The process as claimed in claim 13 in which the suspension agent is selected from the group consisting of methylcellulose, ethylcellulose, polyvinyl alcohol, tricalcium phosphate and potassium salts of styrene-maleic anhydride copolymer.

References Cited

UNITED STATES PATENTS

| | | | |
|---|---|---|---|
| 2,801,992 | 8/1957 | Hutchinson et al. | 260—92.5 |
| 2,928,130 | 3/1960 | Gray | 260—2.5 |
| 2,983,692 | 5/1961 | D'Alelio | 260—2.5 |
| 3,287,286 | 11/1966 | Ohlinger | 260—2.5 |

MURRAY TILLMAN, *Primary Examiner.*

S. H. BLECH, *Examiner.*

M. FOELAK, *Assistant Examiner.*